United States Patent
Stephens (10) Patent No.: US 10,409,602 B2
(45) Date of Patent: Sep. 10, 2019

(54) VECTOR OPERAND BITSIZE CONTROL

(71) Applicant: ARM Limited, Cambridge (GB)

(72) Inventor: Nigel John Stephens, Cambridge (GB)

(73) Assignee: ARM Limited, Cambridge (GB)

( * ) Notice: Subject to any disclaimer, the term of this patent is extended or adjusted under 35 U.S.C. 154(b) by 65 days.

(21) Appl. No.: 15/741,551

(22) PCT Filed: Jun. 21, 2016

(86) PCT No.: PCT/GB2016/051857
§ 371 (c)(1),
(2) Date: Jan. 3, 2018

(87) PCT Pub. No.: WO2017/021680
PCT Pub. Date: Feb. 9, 2017

(65) Prior Publication Data
US 2018/0203699 A1    Jul. 19, 2018

(30) Foreign Application Priority Data
Jul. 31, 2015 (GB) .................................. 1513512.2

(51) Int. Cl.
*G06F 9/30* (2018.01)
*G06F 9/38* (2018.01)

(52) U.S. Cl.
CPC ...... *G06F 9/30149* (2013.01); *G06F 9/30036* (2013.01); *G06F 9/30189* (2013.01); *G06F 9/30192* (2013.01); *G06F 9/3861* (2013.01)

(58) Field of Classification Search
None
See application file for complete search history.

(56) References Cited

U.S. PATENT DOCUMENTS

| 5,513,366 | A | 4/1996 | Agarwal et al. |
| 9,582,466 | B2 * | 2/2017 | Fleischer ............ G06F 15/8076 |
| 9,959,246 | B2 * | 5/2018 | Moudgill ............ G06F 15/8076 |

(Continued)

FOREIGN PATENT DOCUMENTS

| DE | 198 26 826 | 7/1999 |
| EP | 2 889 758 | 7/2015 |

(Continued)

OTHER PUBLICATIONS

International Search Report and Written Opinion of the ISA of PCT/GB2016/051857, dated Sep. 22, 2016, 10 pages.

(Continued)

*Primary Examiner* — Corey S Faherty
(74) *Attorney, Agent, or Firm* — Nixon & Vanderhye P.C.

(57) ABSTRACT

A data processing system (2) includes processing circuitry (18) and decoder circuitry (14) for decoding program instructions and controlling the processor circuitry. The decoder circuitry is responsive to a vector operand bit size dependant instruction executed within a selected exception level state of a hierarchy of exception level states to control the processing circuitry to perform processing with a vector operand bit size governed by a limiting value of the vector operand bit size associated with the currently selected exception level state, any programmable limit value set for an exception level state closer to a top exception level state within the hierarchy and the implemented limit.

15 Claims, 8 Drawing Sheets

(56) References Cited

U.S. PATENT DOCUMENTS

2003/0221086 A1   11/2003  Simovich et al.
2011/0145543 A1    6/2011  Damron
2011/0320765 A1   12/2011  Karkhanis et al.
2018/0203699 A1*  7/2018  Stephens ............. G06F 9/30036

FOREIGN PATENT DOCUMENTS

GB      2 478 731     9/2011
JP      2011-227610  11/2011

OTHER PUBLICATIONS

Combined Search and Examination Report of GB1513512.2, dated Feb. 23, 2016, 6 pages.

\* cited by examiner

Implementation Limited Vector Operand Bit Size = 512

EL1 : $PLV_1$ = 384

EL2 : $PLV_2$ = 256     PLV = programmable limit value

EL3 : $PLV_3$ = 512

| | Exception Level | Vector operand bit size used for vector operand bit size dependent instructions | Returned permitted vector operand bit size |
|---|---|---|---|
| hierarchy of exception level states ↓ | 0 (Bottom, e.g. App) | 256* | 256* |
| | 1 (e.g. Operating System) | 256* | 256* |
| | 2 (e.g. Hypervisor) | 256* | 512# |
| | 3 (Top, e.g. Secure Monitor) | 512 | 512 |

\* = limited by $PLV_2$
# = limited by $PLV_3$

FIG. 3

| Exception Level | Vector operand bit size used for vector operand bit size dependent instructions | Returned permitted vector operand bit size |
|---|---|---|
| 0 | Min [$PLV_1$ : $PLV_{(N-1)}$] | Min [$PLV_1$ : $PLV_{(N-1)}$] |
| 1 | Min [$PLV_1$ : $PLV_{(N-1)}$] | Min [$PLV_2$ : $PLV_{(N-1)}$] |
| 2 | Min [$PLV_2$ : $PLV_{(N-1)}$] | Min [$PLV_3$ : $PLV_{(N-1)}$] |
| ⋮ | ⋮ | ⋮ |
| X | Min [$PLV_X$ : $PLV_{(N-1)}$] | Min [$PLV_{(X+1)}$ : $PLV_{(N-1)}$] |
| ⋮ | ⋮ | ⋮ |
| (N-1) | $PLV_{(N-1)}$ | Implementation Limit |

VECTOR OPERAND BITSIZE CONTROL

This application is the U.S. national phase of International Application No. PCT/GB2016/051857 filed Jun. 21, 2016 which designated the U.S. and claims priority to GB Patent Application No. 1513512.2 filed Jul. 31, 2015, the entire contents of each of which are hereby incorporated by reference.

This disclosure relates to the field of data processing systems. More particularly, this disclosure relates to data processing systems supporting vector processing operations.

It is known to provide a data processing system supporting vector processing operations using at least one vector operand having a vector operand bit size and comprising a plurality of vector elements. Typically, the vector operand bit size is defined as part of the architecture of the data processing system, e.g. the architecture defines that the vector operand bit size will be some specific fixed value, such as 256 bits, 512 bits, 1024 bits etc.

At least some embodiments of the disclosure provide an apparatus for processing data comprising:

processing circuitry to perform processing operations in a selected exception level state of a hierarchy of exception level state extending between a top exception level state and a bottom exception level state; and decoder circuitry to decode program instructions to generate control signals to control said processing circuitry to perform said processing operations, said processing operations including vector processing operations using at least one vector operand; wherein said decoder circuitry is responsive to a vector operand bit size dependent program instruction executed in said selected exception level state to control said processing circuitry to perform vector processing operations dependent upon a vector operand bit size limit value of said selected exception level state and at least one programmable vector operand bit size limit value of an exception level state closer to said top exception level state within said hierarchy than said selected exception level state.

At least some embodiments of the disclosure provide apparatus for processing data comprising:

processing means for performing processing operations in a selected exception level state of a hierarchy of exception level states extending between a top exception level state and a bottom exception level state; and decoder means for decoding program instructions to generate control signals to control said processing means to perform processing operations, said processing operations including one or more vector processing operations using at least one vector operand; wherein said decoder means is responsive to a vector operand bit size dependent program instruction executed in said selected exception level state to control said processing means to perform vector processing operations dependent upon a vector operand bit size limit value of said selected exception level state and at least one programmable vector operand bit size limit value of an exception level state closer to said top exception level state within said hierarchy than said selected exception level state.

At least some embodiments of the disclosure provide a method of processing data comprising:

performing processing operations with processing circuitry in a selected exception level state of a hierarchy of exception level states extending between a top exception level state and a bottom exception level state; and decoding program instructions to generate control signals to control said processing circuitry to perform said processing operations, said processing operations including vector processing operations using at least one vector operand; wherein in response to decoding a vector operand bit size dependent program instruction executed in said selected exception level state, controlling said processing circuitry to perform vector processing operations dependent upon a vector operand bit size limit value of said selected exception level state and at least one programmable vector operand size limit value of an exception level state closer to said top exception level state within said hierarchy than said selected exception level state.

Example embodiments will now be described, by way of example only, with reference to the accompanying drawings in which.

Figure 1:
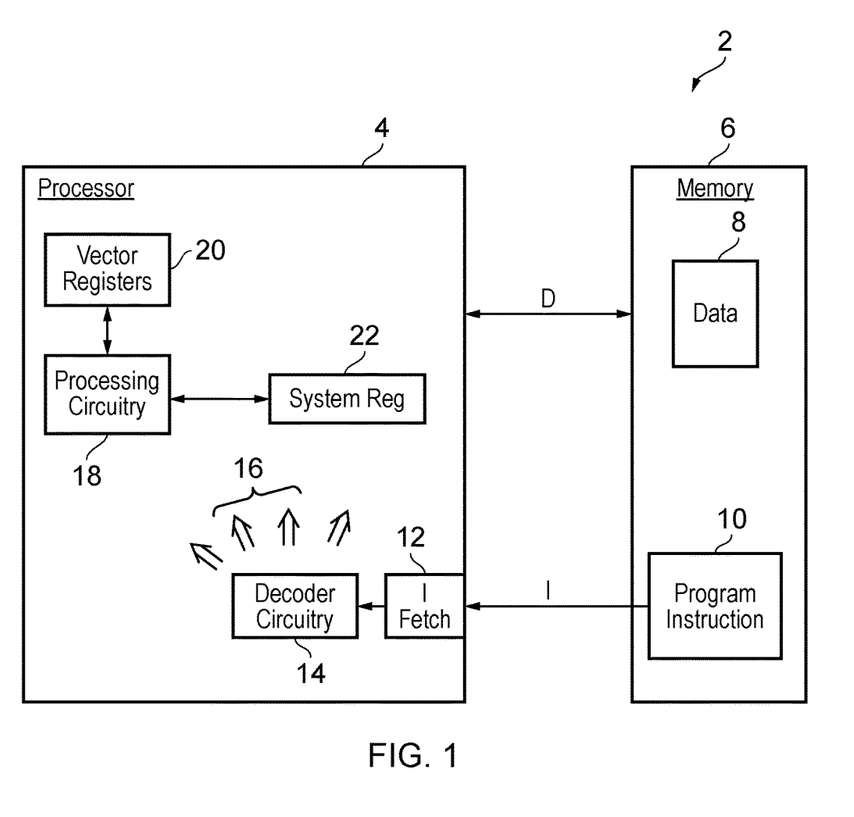
FIG. 1 schematically illustrates a data processing system supporting vector processing using vector operands.

FIG. 1 schematically illustrates a data processing system 2 comprising a processor 4 and a memory 6 storing data 8 and program instructions 10. The processor 4 includes instruction fetch circuitry 12 that fetches program instructions 10 from the memory 6 and passes these to decoder circuitry 14 where they are decoded to generate control signals 16 that control the operation of the processor 4. More particularly, the control signals 16 control processing circuitry 18 to perform processing operations specified by the decoded program instructions. The processing circuitry 18 is coupled to vector register circuitry 20 for storing vector operands having a vector operand bit size and containing a plurality of vector elements. System configuration registers 22 are also coupled to the processing circuitry 18 and serve to store configuration values which may be programmed under software control by the processing circuitry 18 and which serve to configure the behaviour of the processing circuitry 18, such as the vector operand bit size used for vector processing instructions and the constraint of vector operand bit size in accordance with programmable limit values (PLVs).

Figure 2:
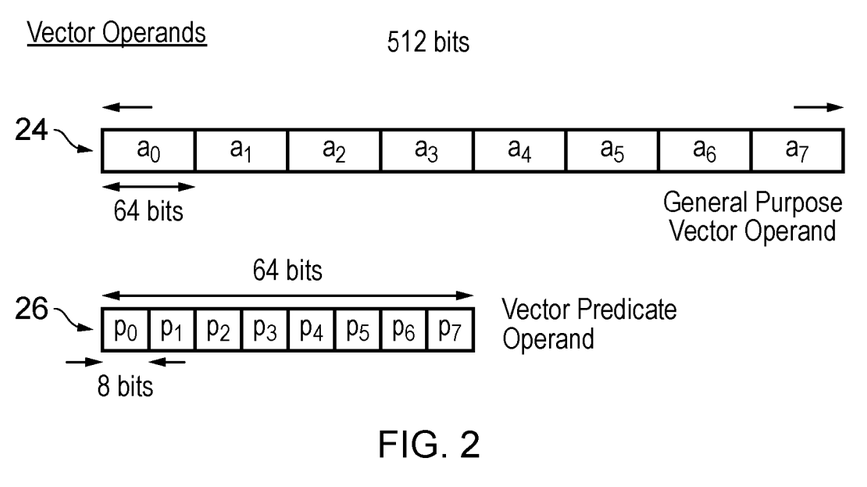
FIG. 2 schematically illustrates example vector operands in the form of a general purpose vector operand and a vector predicate operand.

FIG. 2 schematically illustrates two example forms of vector operands. The first example vector operand 24 is a general purpose vector operand, such as may be used as a source operand or a destination operand when executing a vector program instruction (e.g. a vector arithmetic instruction, a vector logic instruction, etc.). In this example, the general purpose vector operand 24 is illustrated as having a vector operand bit size of 512 bits and as containing eight vector elements each having a vector element bit size of 64 bits. The vector elements are denoted as $a_0$ to $a_7$.

FIG. 2 also illustrates another example form of vector operand, namely a vector predicate operand 26. This may be a vector predicate operand associated with a vector processing operation being performed upon the general purpose vector operand 24. The vector predicate operand 26 contains a plurality of predicate values $p_0$ to $p_7$ which control the execution of an associated vector program instruction in respect of the corresponding vector elements within the vector operand manipulated by that vector program instruction. As an example, predicate values may switch on or switch off the vector processing associated with respective vector elements within a general purpose vector operand. In the example illustrated, the vector predicate operand has 64 bits and each predicate value is eight bits in length.

The data processing system 2 of FIG. 1 is implemented with a particular implementation of the vector register circuitry 22 used to store the vector operands 24, 26. In practice different physical implementations using the processor architecture of the present disclosure may provide vector operands with differing implementation limited maximum bit sizes. A complex implementation aimed at high processing speed may provide vector operands with a large bit size, such as 1024 bits. Conversely, an implementation of a processor aimed at providing a lower energy consumption during operation may support a smaller maximum vector operand bit size such as 128 bits. It is desirable that software written to execute on the processor architecture of the data processing system 2 should be able to be used without any (or significant) modification dependant upon the implementation limited vector operand bit size of the particular processor 4 being used to execute that software. Furthermore, particular software may have been tested/validated to work with particular vector operand bit sizes and the software may itself wish to constrain the vector operand bit sizes used in its execution to be different from (less than) the implementation maximum vector operand bit size. Within a system utilising multiple exception level states (e.g. privilege levels), it may be desirable that software at a higher level of privilege should be able to constrain the vector operand bit size used by software executing at a lower exception level state, e.g. an operating system that has been validated to operate correctly up to a given maximum vector operand bit size may wish to constrain application programs executing under that operating system to not exceed the maximum vector operand bit size for which the operating system has been validated.

Figure 3:
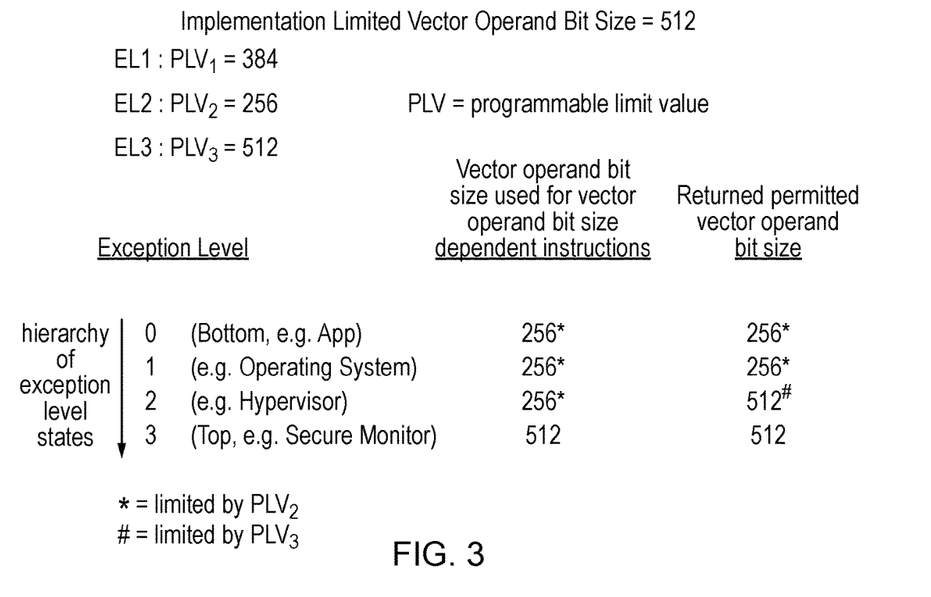
FIG. 3 schematically illustrates a specific example of the behaviour of a vector operand bit size dependant instruction an a permitted vector operand bit size querying instructions within a system having a plurality of exception level states and programmable limit values for controlling vector operand bit size associated with respective exception level states.

FIG. 3 schematically illustrates programmable limit values associated with different exception level states for a particular implementation of the processor 4. In this implementation the implementation limited maximum operand bit size is 512. The processor 4 supports execution in four different exception level states, namely EL0, EL1, EL2 and EL3. These exception level states are arranged in a hierarchy of exception level states extending from a bottom exception level state EL0 to a top exception level state EL3. Each of the exception level states, other than the bottom exception level state, has a programmable limit value ($PLV_x$) associated therewith. In other example embodiments (not shown) the bottom exception level state EL0 may also have a programmable limit value ($PLV_0$) associated therewith. These programmable limit values indicate a vector operand bit size associated with each of the exception level states. In the example of FIG. 3, exception level state EL1 has a programmable limit value of 384 bits, exception level state EL2 has a programmable limit value of 256 bits, and exception level EL3 has a programmable limit level of 512 bits. These programmable limit values indicate the maximum vector operand bit size to be used to execute vector program instructions executing at the exception level state concerned and at all exception level states below the exception level state concerned. Thus, the programmable limit value associated with an exception level state imposes a limit upon the vector operand size for program instructions executing at its own exception level and further imposes this limit upon program instructions executing at lower exception levels within the hierarchy of exception level states. As an example, a hypervisor executing at exception level state EL2 may support a maximum vector operand bit size of 256 and this limit will be imposed upon operating system software executing at exception level EL1 and application software executing at exception level EL0, even though these other instance of software may themselves be capable of using a greater vector operand bit size as may be specified by their own programmable limit value, e.g. the operating system at exception level state ELL When a vector operand bit size dependant instruction is to be executed, then the vector operand bit size employed is controlled (and used by the processing circuitry 18) so as to perform processing with the vector operand bit size governed by a limit value of the currently selected exception level state and any (all) programmable limit value set for an exception level state closer to the top exception level state within the hierarchy than the currently selected selection level state (which itself may or may not be programmable). The bottom exception level state (in this example embodiment) does not have an associated programmable limit value, but is subject to the programmable limit values of all of the other exception level states, which are closer to the top of the hierarchy than the bottom exception level state. A vector program instruction will normally use a vector operand bit size which has a largest value permitted for a vector operand bit size dependant instruction being executed. This provides increased levels of parallel operation.

Software executing at a particular exception level state may require to determine the maximum vector operand bit size it is able to potentially use due to the constraints of exception level states closer the top exception level state. In order to achieve this, the decoder circuitry 14 and processing circuitry 18 support a permitted operand bit size querying instruction. This permitted vector operand bit size querying instruction serves to return a vector operand bit size indicating value constrained by exception level states closer to the top exception level state within the hierarchy than the selected exception level state in which the processing circuitry 18 executes the permitted vector operand bit size querying instruction. Thus, in the example of FIG. 3, a permitted vector operand bit size querying instruction executed in exception level state EL0, corresponding to the bottom exception level state used by an application program, will return a permitted vector operand bit size indicating value of 256 which is constrained by the programmable limit value for exception level state EL2 of 256, even though the exception level state EL0 (in this example embodiment) has no associated limit value and the limit value associated with the operating system executing at exception level EL1 is a higher value of 384. The permitted vector operand bit size indicating value that is returned is dependant upon the programmable limit values associated with higher exception level states but not any programmable limit value associated with the selected exception state at which the permitted vector operand bit size querying instruction is itself executed. In the example of FIG. 3 execution of a permitted vector operand bit size querying instruction at exception level state EL2 returns a permitted vector operand bit size indicating value of 512 as this is the programmable limit value associated with the exception level state EL3 even though the programmable limit value associated with exception level state EL2 itself is 256. The permitted vector operand bit size querying instruction allows software executing at a particular exception level state to determine a maximum vector operand bit size it may use, such as to set its own programmable limit value or to modify some other aspect of its behaviour.

Figure 4:
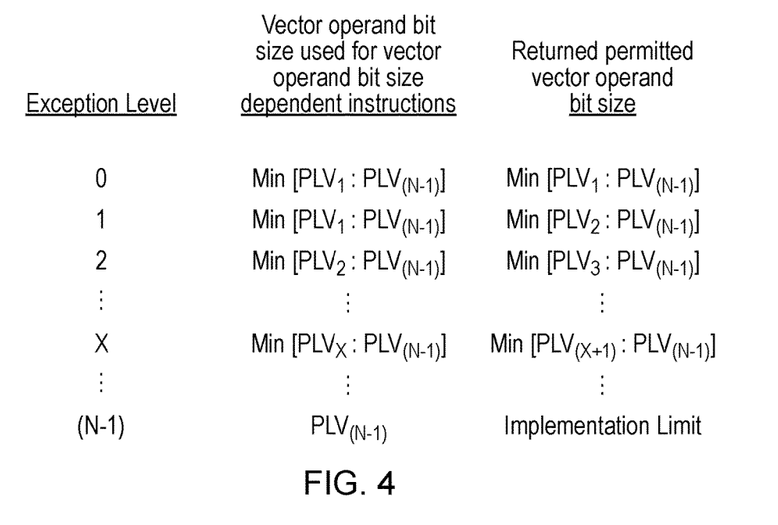
FIG. 4 is a generalised version of FIG. 3 illustrating behaviour of a system having N exception level states.

FIG. 4 is a generalised version of the specific example given in FIG. 3. In this generalised version there are N exception levels. The vector operand bit size used for a vector operand bit size dependant instruction at a given exception level is determined as the minimum indicated by the programmable limit value of that exception level state itself as well has other programmable limit values closer to the top exception level state within the hierarchy. In the cases of exception level EL0 (in this example embodiment), this does not itself have a programmable limit value and accordingly its vector operand bit size is determined as the minimum indicated by all the programmable limit values of the higher exception level states within the hierarchy. The top exception level state EL(N−1) has a vector operand bit size used for its vector operand bit size dependant instructions that is specified by its own programmable limit value $PLV_{(n-1)}$.

In the case of the returned vector operand bit size indicating value in the case of the generalised example of FIG. 4, this is given by the minimum indicated by all programmable limit values associated with higher exception level states within the hierarchy compared to the exception level state at which the permitted vector operand bit size querying instruction is itself executed. In the case of the top exception level state, the returned permitted vector operand bit size indicating value is the implementation limited vector operand bit size of the particularly implementation of the processor 4 (and vector register circuitry 20).

Figure 5:
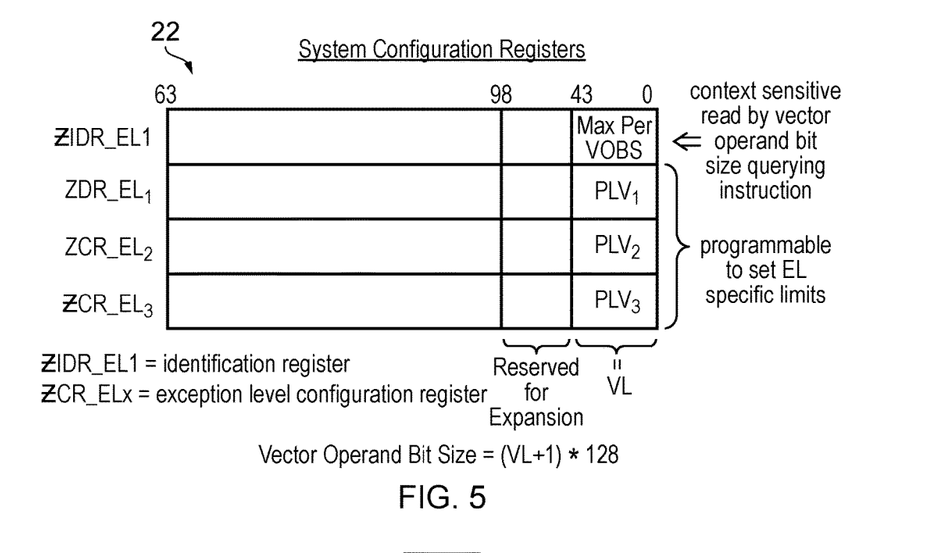
FIG. 5 schematically illustrates system configuration registers used to store programmable limit values and from which a context sensitive read by a permitted vector operand bit size querying instruction may be made.

FIG. 5 schematically illustrates an example of the form of the system registers 22 which may be used to control the above described behaviour. These system registers 22 include an identification register ZIDR_EL1 together with a plurality of exception level configuration registers $ZCR\_EL_x$. The decoder circuitry 14 is responsive to the permitted vector operand bit size querying instruction and the current exception level state (thereby rendering the instruction context sensitive) to read the identification register ZIDR_EL1. The value returned from such a register read is the permitted vector operand bit size indicating value that is determined as described above in relation to the FIGS. 3 and 4. In particular, while execution of the permitted vector operand bit size querying instruction may appear to the programmer as reading an identification system register, in practice the result may be drawn from other sources including the plurality of exception level configuration registers $ZCR\_EL_x$ and the implementation limited maximum operand bit size. In the program model the effect of execution of the vector operand bit size querying instruction is to return the least significant bits of the identification register ZIDR_EL1 This has a value corresponding to the maximum permitted vector operand bit size indicating value as previously discussed. Which of the exception level configuration registers $ZCR\_EL_x$ this return value depends upon is controlled by the exception level state in which the permitted vector operand bit size querying instruction is executed. When executing in the bottom exception level state, an attempt the read the identification register ZIDR_EL1 may not return a value and the instruction may then instead be treated as an undefined instruction triggering an undefined instruction exception. The exception level configuration registers $ZCR\_EL_x$ associated with respective exception level states other than the bottom level exception level states are used to store programmable limit values $PLV_x$ that are set by writes to these exception level configuration registers. A system register read or write instruction to an exception level configuration registers $ZCR\_EL_x$ executed at a given exception level state is permitted to read or write the exception level configuration register of its own exception level state, and any lower exception level state (closer to the bottom exception level state) within the hierarchy of exception level states. An attempt to read or write an exception level configuration register $ZCR\_EL_x$ of a higher exception level state results in undefined instruction behaviour.

The programmable limit values may in this example embodiment may be 4-bit values and are used to indicate vector operand bit size by incrementing by 1 and multiplying by 128. It will be apparent that other mappings between the programmable limit values and the vector operand bit sizes they specify may also be employed, e.g. specify the vector operand size as a power of 2.

Figure 6A:
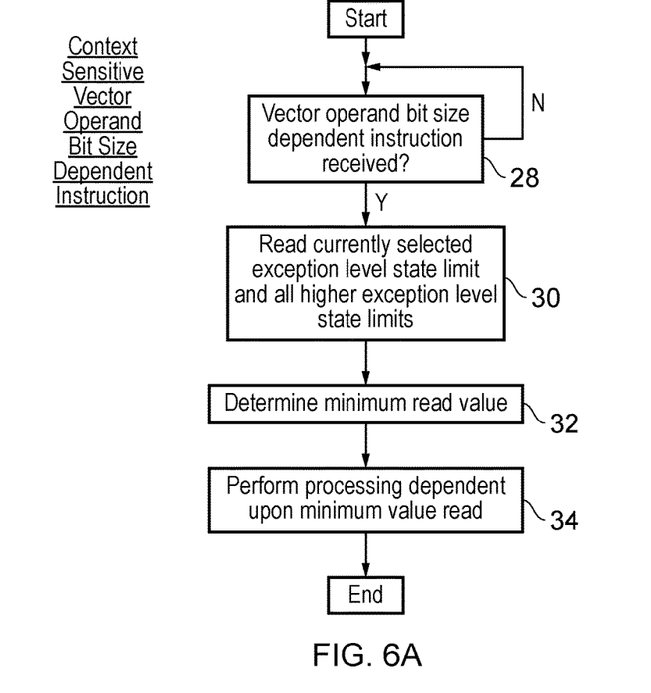
FIGS. 6A and 6B are flow diagrams schematically illustrating the behaviour of a context sensitive vector operand bit size dependant instruction and a context sensitive permitted vector operand size querying instruction respectively.

FIG. 6A is a flow diagram schematically illustrating the execution of a context sensitive vector operand bit size dependant instruction. At step 28 processing waits until a vector operand bit size dependant instruction is received by the decoder 14. The decoder 14 then generates control signals 16 to control the processing circuitry 18 and other elements within the processor to read the currently selected exception level state programmable limit value and all higher exception level state programmable limit values at step 30. Step 32 determines the minimum of these read values. Step 34 performs the processing specified by the vector operand bit size dependant instruction (such as an arithmetic operation, a logical operation or some other operation) using as the vector operand bit size the minimum value determined at step 32.

Figure 6B:
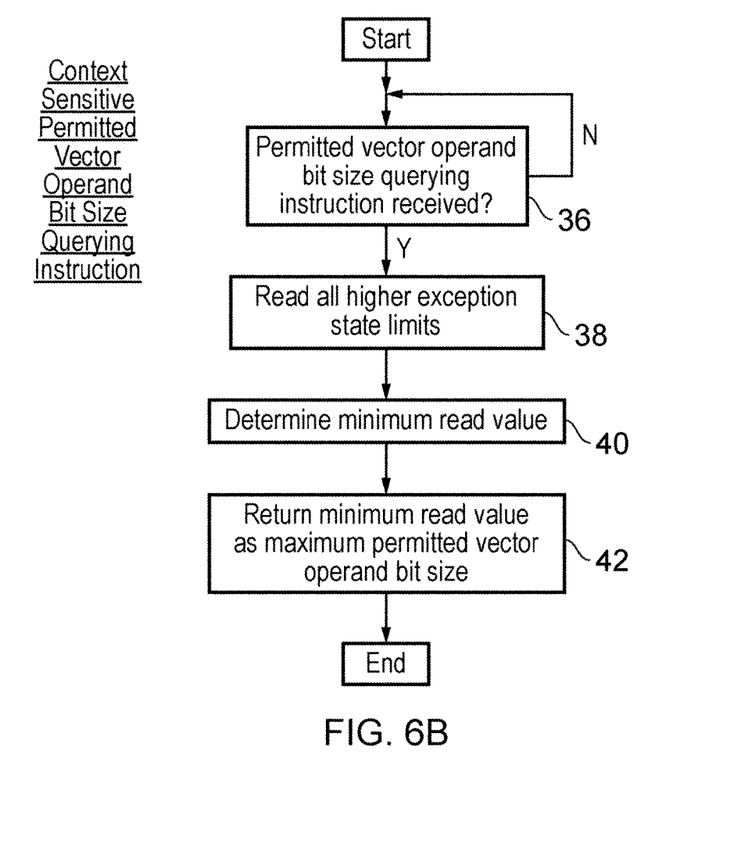

FIG. 6B is a flow diagram schematically illustrating the operation of a context sensitive permitted vector operand bit size querying instruction. At step 36 processing waits until a permitted vector operand bit size querying instruction is received by the decoder circuitry 14. This permitted vector operand bit size querying instruction may be, for example, a read of the identification register ZIDR_EL1 When such an instruction is received, processing proceeds to step 38 where a read is made of the programmable limit values set for all higher exception level states (and as appropriate the implementation limited maximum vector operand bit size). Step 40 determines the minimum of the read values from step 38. Step 42 returns the minimum of the read values as the maximum permitted vector operand bit size (permitted vector operand bit size indicating value). Processing then terminates.

Figure 7:
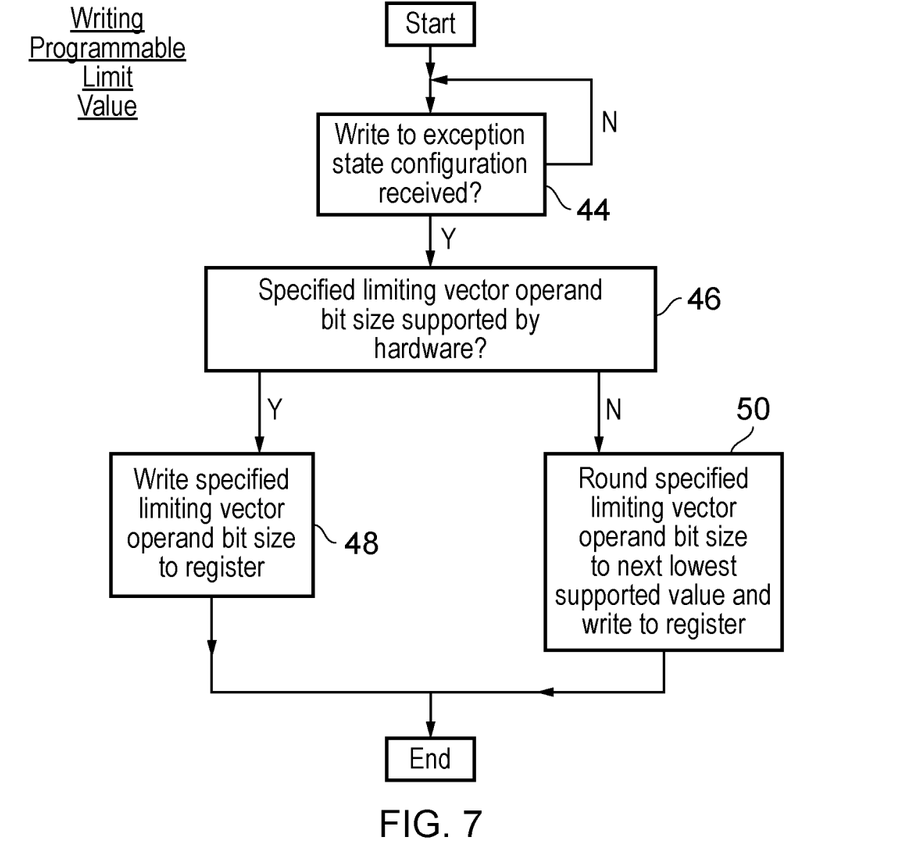
FIG. 7 is a flow diagram schematically illustrating the behaviour when writing a programmable limit value.

FIG. 7 is a flow diagram schematically illustrating the behaviour of the processor 4 when writing a programmable limit value PLV to one of the system configuration registers 22. The programmable limit value which may be set for a given exception level state is limited by the programmable limit values set for higher exception level states, and is also limited by the constraints of the particular implementation of the processor 4. For example, a particular implementation of the processor 4 may support vector operand bit sizes of 512, 256 and 128, but not support vector operand bit sizes of 384. Accordingly, if a system register write instruction to one of the exception level configuration registers ZCR_EL$_x$ is seeking to define a programmable limit value corresponding to a vector operand bit size of 384, this may be permitted by programmable limit values higher in the exception level state hierarchy, but is not permitted by the hardware implementation of the processor 4. In this case, the programmable limit value which is stored within the exception level configuration register ZCR_EL$_x$ in response to the system register write instruction is rounded to the next lowest hardware supported vector operand bit size. Thus, an attempted write of a programmable limited value corresponding to 384 in the above example may be permitted by the programmable limit values of higher exception level states, but is not permitted by the hardware implementation, and accordingly the values stored is rounded to the next lowest supported vector operand size, namely 256. By attempting to write different programmable limit values into the exception level configuration registers and then reading back the values which have been stored, software executing at a particular exception level state may determine which vector operand bit sizes are and are not supported as a consequence of both programmable limits set by software at higher exception level state and limits set by the hardware implementation.

At step 44 of FIG. 7 processing waits until an instruction writing to an exception level configuration register ZCR_EL$_x$ is received by the decoder 14. Step 46 determines whether the specified programmable limit value being written is one supported by the hardware. Additional checks (not illustrated) are performed to ensure that the written value does not conflict with the programmable limit values of higher exception level states.

If the programmable limit value being written by the instruction decoded at step 44 is support by the hardware (and software controlled configuration), then step 48 serves to write the specified programmable limit value to the state configuration register concerned. If the programmable limit value to be written is determined by step 46 not to be supported by the hardware, then processing proceeds via step 50 whereby a rounded programmable limit value is instead written to the state configuration value having being rounded to the next lowest value that is supported by the hardware implementation concerned.

Figure 8:
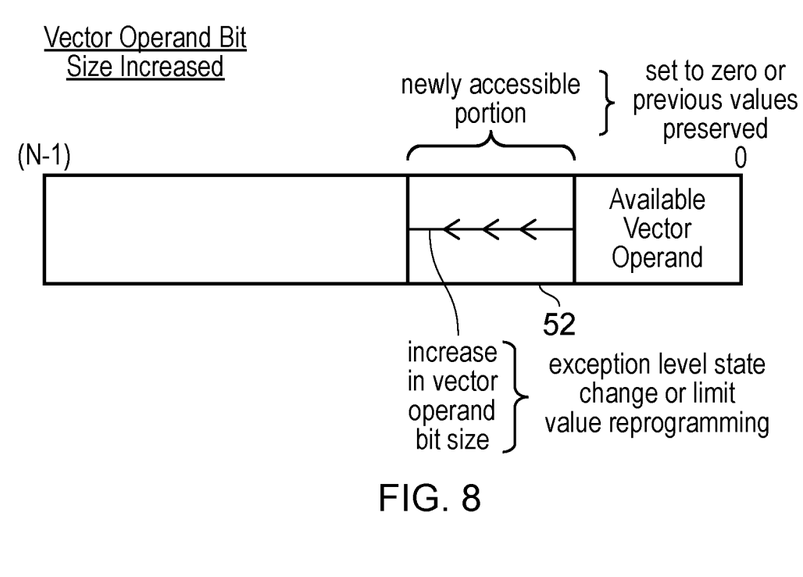
FIG. 8 schematically illustrates behaviour when a vector operand size is increased.

FIG. 8 schematically illustrates the behaviour of the processing system when the vector operand bit size is increased. It will be appreciated that by the use of the programmable limit values software may dynamically changed the vector operand bit size in use. Such changes can have significant operational consequences to the system and this is one reason why the bottom exception level state is not permitted to control its own vector operand bit size so as to avoid application programs which typically execute in this bottom exception level state, from producing undesired behaviour.

When the vector operand bit size is increased (such as to a response to a change of a programmable limit value, or a change of exception level state to operation within an exception level state permitting the use of larger vector operand bit sizes), a newly accessible portion 52 of a vector operand becomes available for use by vector processing instructions. In order to help provide deterministic behaviour of the processing system 2, the processing system 2 responds to such increases in vector operand bit size by zeroing the values within the newly accessible portion of the vector operand, or alternatively by ensuring that the values within the newly accessible portion have been preserved in a state that they had when the newly accessible portion was last available for use.

Figure 9:
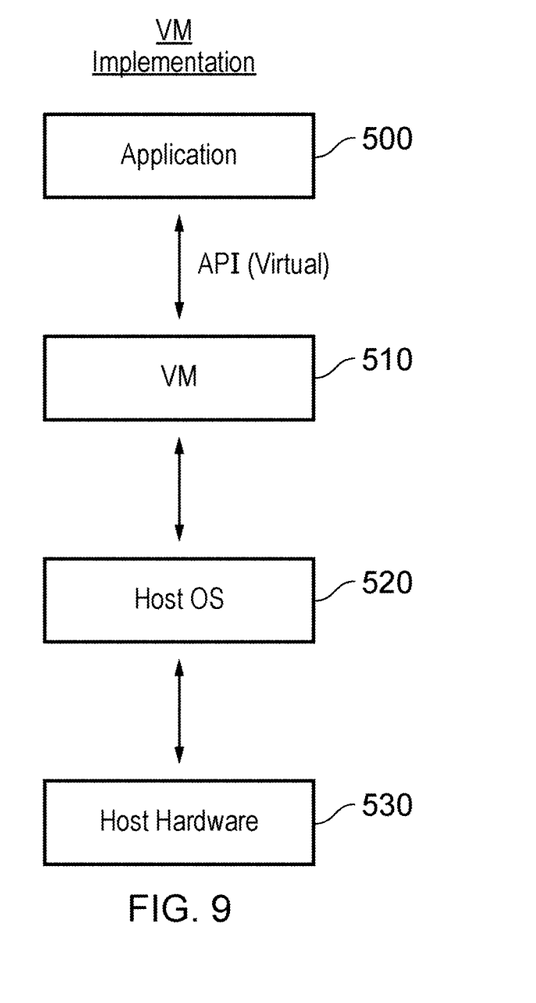
FIG. 9 schematically illustrates a virtual machine implementation.

FIG. 9 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 530 running a host operating system 520 supporting a virtual machine program 510. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 510 provides an application program interface to an application program 500 which is the same as the application program interface which would be provided by the real hardware which is the device being modelled by the virtual machine program 510. Thus, the program instructions, including the control of memory accesses described above, may be executed from within the application program 500 using the virtual machine program 510 to model their interaction with the virtual machine hardware.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. Apparatus for processing data comprising:
    processing circuitry to perform processing operations in a selected exception level state of a hierarchy of exception level state extending between a top exception level state and a bottom exception level state; and
    decoder circuitry to decode program instructions to generate control signals to control said processing circuitry to perform said processing operations, said processing operations including vector processing operations using at least one vector operand; wherein
    said decoder circuitry is responsive to a vector operand bit size dependent program instruction executed in said selected exception level state to control said processing circuitry to perform vector processing operations dependent upon a vector operand bit size limit value of said selected exception level state and at least one programmable vector operand bit size limit value of an exception level state closer to said top exception level state within said hierarchy than said selected exception level state.

2. Apparatus as claimed in claim 1, wherein said vector operand bit size has a largest value permitted by said limit value for said selected exception level state and also permitted by any programmable limit value set for an exception level state closer to said top exception level state within said hierarchy than said selected exception level state.

3. Apparatus as claimed in claim 1, wherein said decoder circuitry is responsive to a permitted vector operand bit size querying instruction to return a permitted vector operand bit size indicating value governed by any programmable limit value set for an exception level state closer to said top exception level state within said hierarchy than said selected exception level state.

4. Apparatus as claimed in claim 1, comprising a plurality of exception level configuration registers storing respective programmable limit values for said vector operand bit size associated with corresponding exception level states within said hierarchy.

5. Apparatus as claimed in claim 4, comprising a respective exception level configuration register for each exception level state in said hierarchy excluding said bottom exception level state.

6. Apparatus as claimed in claim 4, wherein said processing circuitry is permitted to access an exception level configuration register of said selected exception state and any exception level configuration registers of exception level states closer to said bottom exception level state within said hierarchy than said selected exception level state.

7. Apparatus as claimed in claim 3, wherein said processing circuitry is blocked from querying said permitted vector operand bit size using said permitted vector operand bit size querying instruction when said processing circuitry is in said bottom exception level state.

8. Apparatus as claimed in claim 1, wherein said processing circuitry comprises vector operand register circuitry to store vector operands with up to an implementation limited vector operand bit size and wherein said programmable limit values control said processing circuitry to perform said vector operand bit size dependent instruction using a vector operand bit sizes equal to or less than said implementation limited vector operand bit size.

9. Apparatus as claimed in claim 1, wherein said vector operand is one of: a general purpose vector operand; and a vector predicate operand specifying predicate values for controlling execution of a vector program instruction.

10. Apparatus as claimed in claim 1, wherein said processing circuitry is responsive to an attempt to set a programmable limit value to correspond to a vector operand bit size not supported by said apparatus to set said programmable limit value to a next lower vector operand bit size that is supported by said apparatus.

11. Apparatus as claimed in claim 1, wherein said processing circuitry is responsive to an increase in vector operand bit size, upon at least one of a change of said selected exception level state and a change in at least one said programmable limit value, to provide in a newly accessible portion of said vector operand one of zero values or values equal to values held in said newly accessible portion when said newly accessible portion was last accessible.

12. Apparatus as claimed in claim 3, wherein said permitted vector operand bit size querying instruction is a system register read instruction.

13. Apparatus for processing data comprising:
processing means for performing processing operations in a selected exception level state of a hierarchy of exception level states extending between a top exception level state and a bottom exception level state; and
decoder means for decoding program instructions to generate control signals to control said processing means to perform said processing operations, said processing operations including one or more vector processing operations using at least one vector operand; wherein
said decoder means is responsive to a vector operand bit size dependent program instruction executed in said selected exception level state to control said processing means to perform vector processing operations dependent upon a vector operand bit size limit value of said selected exception level state and at least one programmable vector operand bit size limit value of an exception level state closer to said top exception level state within said hierarchy than said selected exception level state.

14. A method of processing data comprising:
performing processing operations with processing circuitry in a selected exception level state of a hierarchy of exception level states extending between a top exception level state and a bottom exception level state; and
decoding program instructions to generate control signals to control said processing circuitry to perform said processing operations said processing operations include vector processing operations using at least one vector operand; wherein
in response to decoding a vector operand bit size dependent program instruction executed in said selected exception level state, controlling said processing circuitry to perform vector processing operations dependent upon a vector operand bit size limit value of said selected exception level state and at least one programmable vector operand size limit value of an exception level state closer to said top exception level state within said hierarchy than said selected exception level state.

15. A computer program stored on a non-transitory storage medium for controlling a computer to provide a virtual machine execution environment corresponding to apparatus as claimed in claim 1.

* * * * *